US010407082B2

(12) United States Patent
Wagner et al.

(10) Patent No.: US 10,407,082 B2
(45) Date of Patent: Sep. 10, 2019

(54) METHOD FOR PRODUCING A COMMUNICATIONS LINK BETWEEN A MOTOR VEHICLE AND A MOBILE USER TERMINAL, COMPUTER PROGRAM PRODUCT, MOBILE USER TERMINAL, SYSTEM AND MOTOR VEHICLE

(71) Applicant: GM GLOBAL TECHNOLOGY OPERATIONS LLC, Detroit, MI (US)

(72) Inventors: Nikolas Wagner, Ruesselsheim (DE); Gerald Schmidt, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 145 days.

(21) Appl. No.: 15/476,600

(22) Filed: Mar. 31, 2017

(65) Prior Publication Data
US 2017/0282936 A1    Oct. 5, 2017

(30) Foreign Application Priority Data

Apr. 1, 2016    (DE) .................. 10 2016 004 042

(51) Int. Cl.
| | |
|---|---|
| *B60W 50/16* | (2012.01) |
| *G05D 1/00* | (2006.01) |
| *H04L 29/08* | (2006.01) |
| *H04W 76/14* | (2018.01) |
| *B60W 50/14* | (2012.01) |

(52) U.S. Cl.
CPC ............ *B60W 50/16* (2013.01); *B60W 50/14* (2013.01); *G05D 1/0061* (2013.01); *H04L 67/12* (2013.01); *H04W 76/14* (2018.02); *B60W 2050/146* (2013.01)

(58) Field of Classification Search
None
See application file for complete search history.

(56) References Cited

U.S. PATENT DOCUMENTS

| | | |
|---|---|---|
| 9,090,261 B2 | 7/2015 | Kitagishi et al. |
| 9,134,729 B1 | 9/2015 | Szybalski et al. |
| 9,650,057 B2 | 5/2017 | Langenhan |

(Continued)

FOREIGN PATENT DOCUMENTS

| | | |
|---|---|---|
| DE | 102014106241 A1 | 5/2015 |
| DE | 102014214078 A1 | 1/2016 |

OTHER PUBLICATIONS

German Patent Office, German Search Report for German Application No. 102016004042.4, dated Mar. 21, 2017.

*Primary Examiner* — Todd M Melton
*Assistant Examiner* — Jason R Roberson
(74) *Attorney, Agent, or Firm* — Lorenz & Kopf, LLP

(57) ABSTRACT

A method is disclosed for producing a communications link between a motor vehicle and a mobile user terminal. The mobile user terminal and/or the motor vehicle send a request to establish a communications link between the motor vehicle and the mobile user terminal. A check is carried out as to whether the mobile user terminal is configured to output a transfer indication sent from the motor vehicle to the mobile user terminal. A communications link is established between motor vehicle and mobile user terminal if the check is successful. A communications link is not established between motor vehicle and mobile user terminal if the check is unsuccessful.

8 Claims, 3 Drawing Sheets

(56) References Cited

U.S. PATENT DOCUMENTS

| | | |
|---|---|---|
| 2009/0287367 A1 | 11/2009 | Salinger |
| 2014/0088815 A1* | 3/2014 | Kitagishi .......... B60W 50/0098 |
| | | 701/29.1 |
| 2015/0210272 A1 | 7/2015 | Edgren |
| 2017/0236210 A1* | 8/2017 | Kumar ................. B60W 10/04 |
| | | 705/4 |

* cited by examiner

METHOD FOR PRODUCING A COMMUNICATIONS LINK BETWEEN A MOTOR VEHICLE AND A MOBILE USER TERMINAL, COMPUTER PROGRAM PRODUCT, MOBILE USER TERMINAL, SYSTEM AND MOTOR VEHICLE

CROSS-REFERENCE TO RELATED APPLICATION

This application claims priority to German Patent Application No. 102016004042.4, filed Apr. 1, 2016, which is incorporated herein by reference in its entirety.

TECHNICAL FIELD

The present disclosure pertains to a method for producing a communications link between a motor vehicle and a mobile user terminal, a computer program product, a mobile user terminal, a system and a motor vehicle.

BACKGROUND

It is foreseeable that in future it will be possible to drive motor vehicles in an automated or autonomous manner for relatively long distances. During automated driving, a driver of the motor vehicle is allowed to pay attention to other things, such as reading, writing, listening to music, gaming or other activities. Many of these activities take place on electronic devices, for example mobile telephones, tablets (computers with touch-sensitive displays, usually without keyboards), laptops (mobile computers), smart watches (small, networked computers worn on the wrist) or the like.

However, situations may arise in which a driver has to assume control of the motor vehicle. In some situations, an instance of human decision will be needed. It is also foreseeable that automated driving may not be permitted in certain regions, for example metropolitan areas, because of the possible risk to pedestrians. Thus, these situations may be planned, for example when entering a town or city, or unplanned, for example if a hazard situation occurs in which a decision is needed from the driver. The driver must therefore be given an indication that control of the vehicle must be taken again. It must be possible for such an indication to be perceived reliably by the driver.

U.S. Pat. No. 9,134,729 B1 discloses a method for transferring control of a vehicle from the driver to a control device of an automatically driving vehicle and for transferring control from the control device to the driver. In the event that the control computer cannot provide control of the vehicle any longer, the driver is warned by a color signal on the vehicle console or by an audible signal. The problem with this solution is that the attention of the driver is sometimes taken up with other activities, for example reading, writing or listening to music, and the driver is not looking in the direction of a visual warning signal or is distracted by sound exposure.

Accordingly, there is a need to improve communication of a transfer indication to the driver with greater reliability than previously such that the indication will be perceived.

SUMMARY

In accordance with the present disclosure, a method for producing a communications link between a motor vehicle and a mobile user terminal is disclosed. The mobile user terminal and/or the motor vehicle send a request to establish a communications link between the motor vehicle and the mobile user terminal. A check is carried out as to whether the mobile user terminal is configured to output a transfer indication sent from the motor vehicle to the mobile user terminal. A communications link is established between motor vehicle and mobile user terminal if the check is successful, and a communications link is not established between motor vehicle and mobile user terminal if the check is unsuccessful.

In this manner, it is ensured that a mobile user terminal in a motor vehicle that is capable of automated driving can only use a motor vehicle infrastructure via a communications link if the mobile user terminal can output a transfer indication. Otherwise, the use of the motor vehicle infrastructure, e.g. a mobile hotspot or reproduction of media stored on the mobile user terminal via the motor vehicle, can be denied. According to a development, the check can also take place after the communications link has been established, e.g. regularly, and be cancelled again when the condition is no longer met.

A corresponding mobile user terminal can be for example a mobile telephone, a tablet, a computer, in particular a portable computer, a smart watch or the like. Corresponding user terminals can establish a communications link in a conventional manner, for example via a LAN link. Data representing communication with the mobile user terminal can also be transmitted via USB or other interfaces. The communications link can be established accordingly via different protocols and/or standards. The mobile user terminal can be removed from the motor vehicle and can be a personal device of the driver or another person or unit, which is also used outside the motor vehicle.

In a first additional embodiment, if the check is successful, the motor vehicle generates a transfer indication and sends it to the mobile user terminal by the communications link. The mobile user terminal outputs the transfer indication in a manner perceptible to the driver. Then and at the appropriate time, the driver can assume control of the automatically driving motor vehicle and thereby end the automatic driving mode.

In the process, a transfer indication is generated, sent to the mobile user terminal by the communications link and output on the user terminal. If the driver's attention is directed to an activity with the mobile user terminal, for example reading, writing or listening to music on a mobile telephone, tablet or laptop, the output of the transfer indication on the mobile user terminal catches the driver's attention more reliably than an output in an automatically driving motor vehicle, since the output takes place on the medium to which the driver is paying attention at the time.

According to a further possible additional embodiment, the transfer indication can be output visually and/or audibly. Visual indications can catch the driver's attention during all reading or writing activities. An audible output can also ensure that a driver who has closed eyes or whose attention is directed to an acoustic activity can be made aware of an imminent transfer. In addition, a haptic request can be generated, for example on the basis of a vibration module, which is often provided. The different types of output can be combined. Corresponding combined outputs of visual, audible and/or haptic indications increase the likelihood of being perceived by the driver.

According to another additional embodiment, a computer program product can be stored on the mobile user terminal, loaded into a computation unit and executed, the computer program product processing the transfer indication and outputting it on the mobile user terminal. In the case of a tablet, smart watch or mobile telephone, the computer program product can be for example an app, which is executed on the mobile user terminal. Such a computer program product can be for example a prerequisite for the communications link between motor vehicle and mobile user terminal. The computer program product can be loaded automatically from a memory and executed when persons enter the motor vehicle or when the motor vehicle is started.

According to another additional embodiment, the computer program product can have resource priority in the mobile user terminal. In this manner, it can be ensured that the transfer indication is output to the driver even if the processor of the mobile user terminal is busy with other resource-intensive tasks, for example during a computer game. The resource priority can ensure that there are always sufficient resources for processing and outputting the transfer indication. The resource priority can also mean that other processes in terms of the output media, for example a screen, loudspeaker or headphone connection, vibration signal can be deprioritized and the transfer indication can be output. The transfer indication can also have resource priority such that volume, brightness and vibration intensity can be changed accordingly in order to ensure that the driver perceives it.

In another additional embodiment, the transfer indication is output via a communications system that is part of the motor vehicle. A transfer indication can thus be output simultaneously both on the mobile user terminal and in the motor vehicle, which increases the likelihood of it being perceived. This can also ensure that the transfer indication is perceived by any other passengers in the motor vehicle.

According to another additional embodiment, the communications link is wireless and the transfer indication is sent wirelessly. Wireless communications links can be established automatically as soon as the motor vehicle is started. A transfer indication can then also be output if a wired communications link is not established, for example because it has been forgotten by the driver.

In another additional embodiment, the transfer indication is output on a plurality of mobile user terminals simultaneously. This requires that the motor vehicle has established a communications link with a plurality of mobile user terminals simultaneously or that at least one mobile user terminal has established a communications link with the motor vehicle and the user terminals have established a communications link with each other. Since drivers of motor vehicles often have and carry several mobile user terminals, for example a mobile telephone and a laptop, a transfer indication can in this manner be output on several of these devices, which increases the likelihood that the transfer indication is output on the mobile user terminal that the driver is currently using.

According to another embodiment, the transfer indication can be a transfer request. Such a transfer request can be present for example in an emergency situation or a situation with increased hazard potential, in which the driver should assume control of the motor vehicle with little notice. Rapid perception of the transfer request can thus be achieved. Alternatively, the transfer indication can also be in the form of a pre-announcement, for example because automated driving must end within a foreseeable time space and/or distance, for instance because the motor vehicle will drive into a town or city area.

In another embodiment, if the check is not completed successfully, an automated driving mode is not activated. This prevents a situation in which a transfer indication cannot be displayed on the mobile user terminal.

In another aspect, the present disclosure relates to a device for establishing a communications link between a motor vehicle and a mobile user terminal. The mobile user terminal and/or the motor vehicle are configured to send a request to establish a communications link with the motor vehicle to the motor vehicle and/or to the mobile user terminal. The device is configured to check whether the mobile user terminal is designed to output a transfer indication sent by the motor vehicle to the mobile user terminal. The device is also configured to establish a communications link between motor vehicle and mobile user terminal if the check is successful, and not to establish a communications link between motor vehicle and mobile user terminal if the check is unsuccessful.

According to a first possible development, the device is configured to transfer the control of an automatically driving motor vehicle to a driver of the motor vehicle, to establish a communications link between the motor vehicle and a mobile user terminal, to generate a transfer indication, and/or to send the transfer indication to the mobile user terminal. The mobile user terminal is configured to output the transfer indication in a manner perceptible to the driver. The perceptible output of the transfer indication can be visual, audible and/or haptic.

In another additional embodiment, a computer program product can be loaded and executed on the mobile user terminal. The mobile user terminal is configured to process the transfer indication by the computer program product and for outputting the transfer indication.

According to another additional embodiment, the mobile user terminal is configured to allocate resource priority to the computer program product.

In another additional embodiment, the motor vehicle can have a communications system for outputting the transfer indication.

According to another embodiment, the communications link can be wireless communications, and the transfer indication is sent via the wireless communications link.

According to another additional embodiment, a plurality of mobile user terminals can be present, and the communications link is configured to establish a communications with the plurality of mobile user terminals. The transfer indication is communicated to the plurality of mobile user terminals simultaneously for output on the plurality of mobile user terminals. In another additional embodiment, the device is configured to send a transfer request to the mobile user terminals.

A further independent subject relates to a computer program product with a computer-readable storage medium having commands embedded thereon, which, when executed by a processor or computation unit, is configured to carry out the above-described method. Reliable output of a transfer indication by the corresponding computer program product can thereby be achieved. Another independent subject relates to a mobile user terminal having a computer program product of the above-mentioned type. A correspondingly equipped mobile user terminal can output a transfer indication or a transfer request with the aid of the computer program product. According to a first additional embodiment, the mobile user terminal can be a mobile telephone, a tablet, a laptop, an electronic book-reading device, a music-playing device or a smart watch.

A further independent subject relates to a system having a mobile user terminal of the above-described type and a motor vehicle having a computer program product with a computer-readable storage medium having commands embedded thereon, which, when executed by a processor or computation unit, is configured to carry out a method of the above-described type. A corresponding system has a mobile user terminal and a motor vehicle, which are designed to enter into a communications link with each other and to output a transfer indication via the communications link.

A further independent subject relates to a motor vehicle of a system of the above-described type. Such a motor vehicle can output a communication indication to the driver by a mobile user terminal.

In a first additional embodiment of the motor vehicle, a device for automated driving configured to establish a communications link with a mobile user terminal can be provided. The device for automated driving can have devices for intervening in control of the motor vehicle, for example steering, accelerator and brake, and a gearbox. The device can furthermore have sensors for monitoring traffic, for example cameras, radar, Lidar and the like. The device can furthermore include a navigation system to establish a navigation link.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
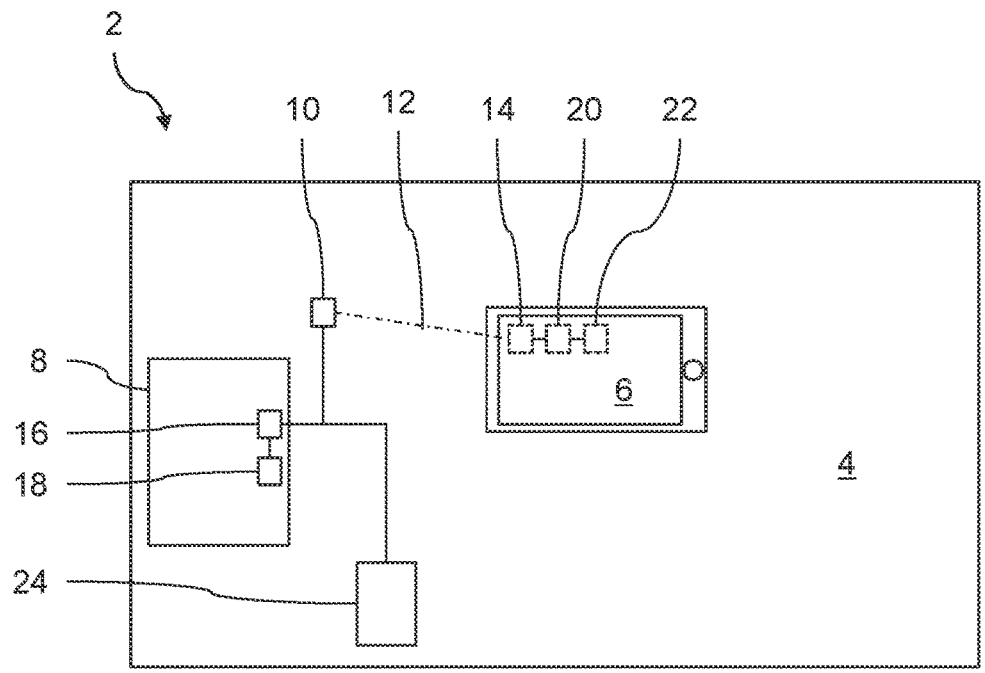
FIG. 1 schematically shows a system with a motor vehicle and a mobile user terminal.

FIG. 1 shows a system 2 with a motor vehicle 4 and a mobile user terminal 6, in this case a mobile telephone.

The motor vehicle 4 has a device 8 for automated driving, for example a corresponding control device in addition to the associated sensors and actuators, for example cameras, radar, Lidar and motor control system, gear control system, brake control system, steering actuator and the like. Furthermore, the motor vehicle 4 has a communications interface 10 for establishing a communications link 12 (shown with dashed lines) with a communications interface 14 of the mobile user terminal 6. The corresponding interfaces 10, 14 can be implemented for example by WLAN modules. The automated control system 8 has a processor 16 and a memory 18. Processor 16 and memory 18 serve to store and execute a computer program product for generating and transferring a transfer indication by the communications interface 10. The motor vehicle 4 has a communications device 24, via which the transfer indication can likewise be output. The communications device 24 can be visual and/or audible, for example using loudspeakers and a display.

Figure 2:
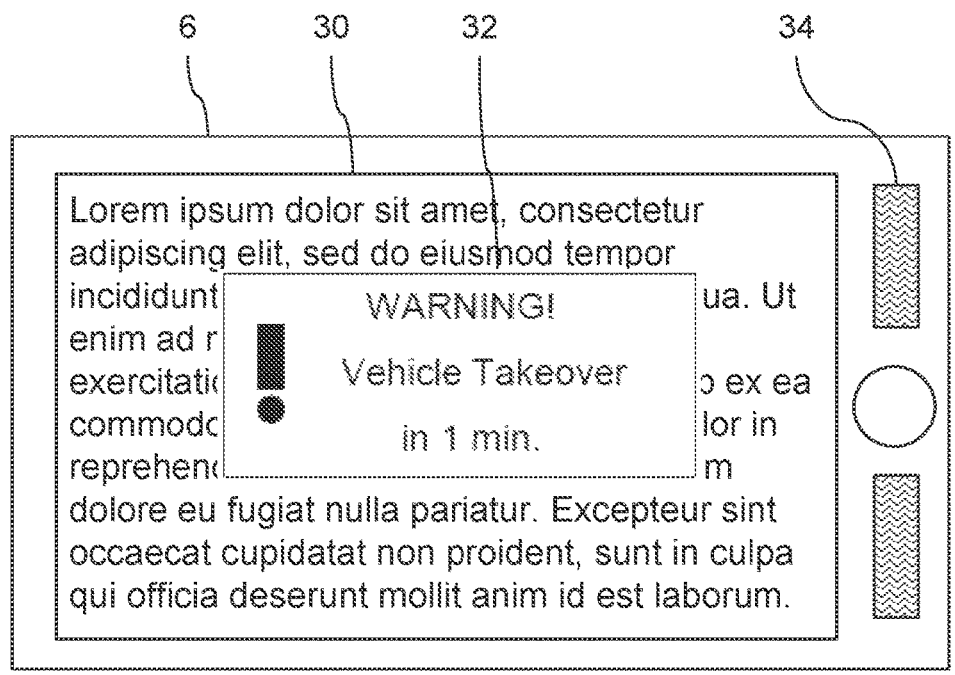
FIG. 2 schematically shows the mobile user terminal of FIG. 1 in an enlarged illustration.

FIG. 2 shows the mobile user terminal 6 in an enlarged illustration. The mobile user terminal 6 has a processor 20 and a memory 22 for storing and executing a computer program product for receiving and perceptibly outputting the transfer indication. The mobile user terminal 6 allocates resource priority to the executed computer program product. A correspondingly perceptible transfer indication, which can be visual, audible and/or haptic, is generated via the mobile user terminal 6, as shown in FIG. 2.

The mobile user terminal 6 has a display 30, on which an email is being written. The email takes up most of the space of the display 30. After a transfer indication has been generated and sent to the mobile user terminal 6, a visual transfer indication 32 is generated, according to which control of the motor vehicle 4 should be assumed. The visual transfer indication 32 can be in text and/or symbol form, supported by color. In addition, there can be a simultaneous output via a loudspeaker 34.

Figure 3:
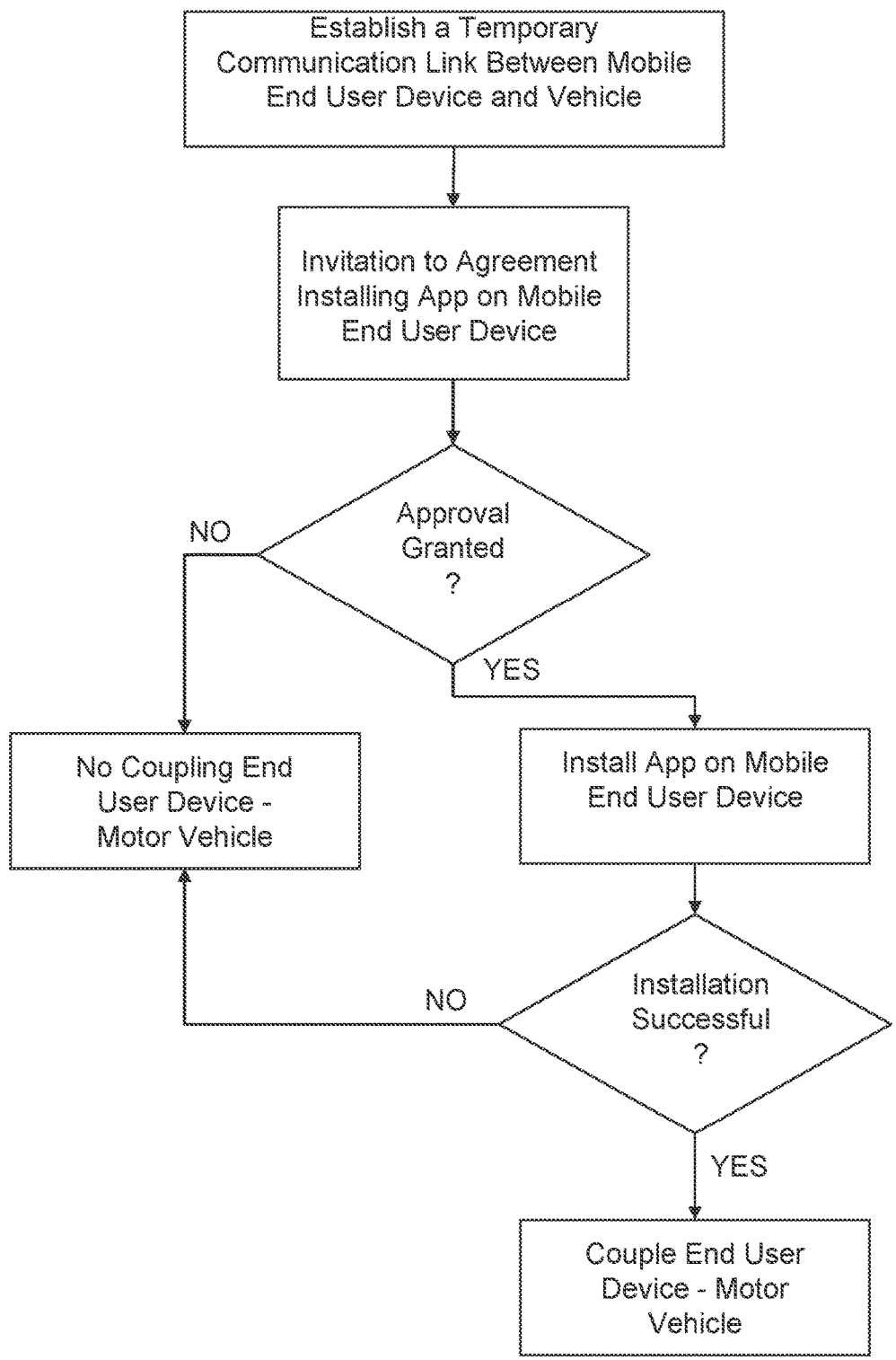
FIG. 3 schematically shows a flow chart of a first coupling between mobile user terminal and motor vehicle, and FIG. 4 schematically shows a flow chart of the method.

FIG. 3 shows a flow chart of a first coupling between mobile user terminal 6 and motor vehicle 4. Initially, mobile user terminal 6 and motor vehicle 4 establish a preliminary communications link, for example via WLAN. The driver of the motor vehicle 4 is requested, via displays and input elements provided therefor, to permit a corresponding program, often referred to as an app, which makes it possible to display a transfer request, to be installed on the mobile user terminal 6.

If the driver of the motor vehicle 4 does not agree, a coupling of the mobile user terminal 6 and the motor vehicle 4 is not permitted, and therefore the mobile user terminal 6 cannot use the infrastructure offered by the motor vehicle 4, which infrastructure can include, depending on the configuration, control possibilities of motor vehicle functions, streaming functions (transmission of media content from motor vehicle 4 to mobile user terminal 6 or vice versa), access to the Internet via strong sending and receiving functions of the motor vehicle 4 etc.

If the driver agrees, the corresponding program is installed on the mobile user terminal 6. To this end, further steps on the mobile user terminal may be necessary, e.g. downloading the program and carrying out or authorising the installation. A check is then carried out as to whether the program has been installed successfully. If this is not the case, a coupling between mobile user terminal 6 and motor vehicle 4 is not permitted. If the program is installed successfully, a coupling and a future coupling are permitted.

Figure 4:
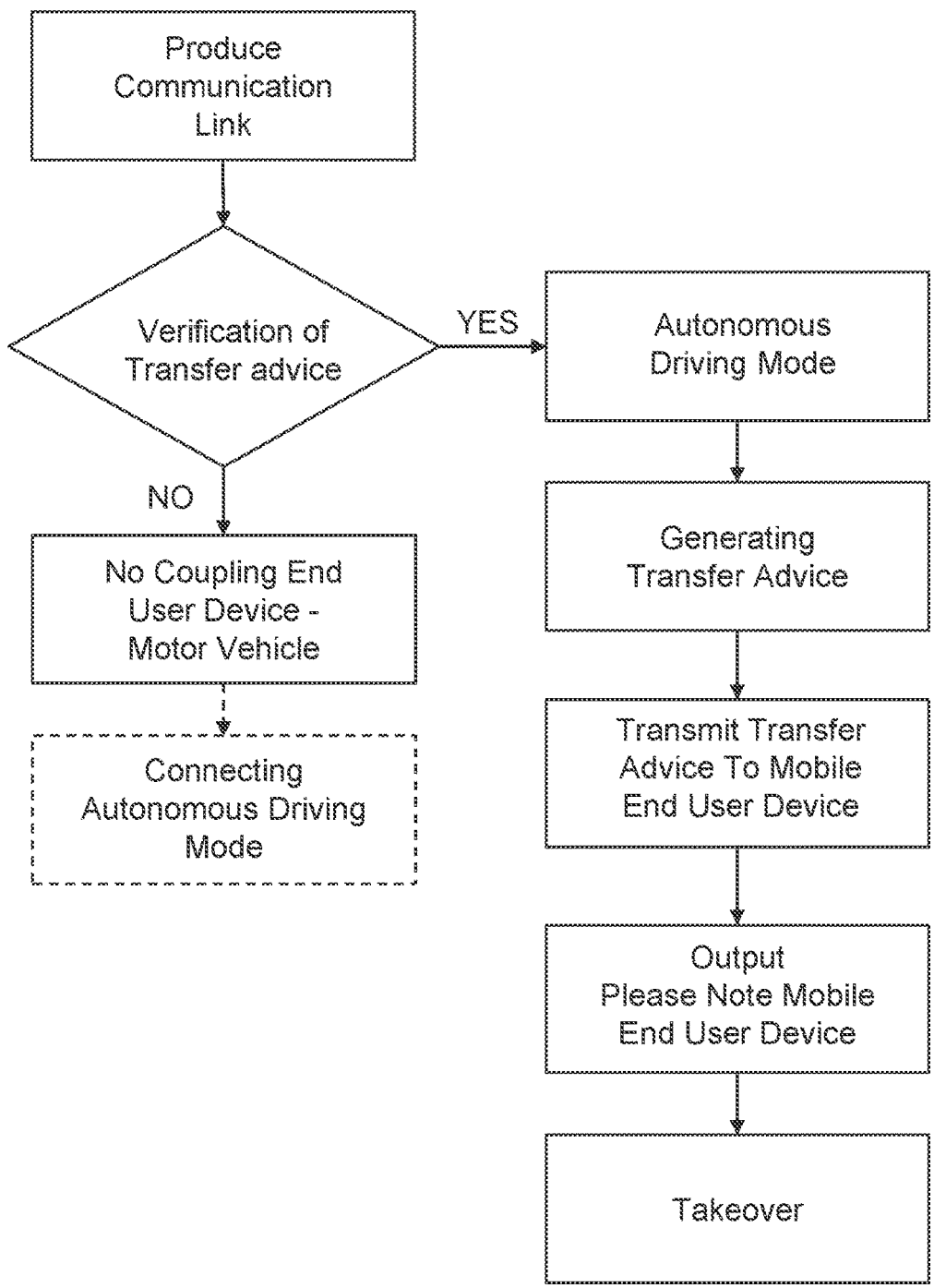

FIG. 4 shows a flow chart of the method in accordance with the present disclosure. Initially, the mobile user terminal 6 produces a request to establish a communications link 12 with the motor vehicle 4. The request can also be made from the motor vehicle 4 to the mobile user terminal 6. Then, a check is carried out as to whether the mobile user terminal 6 is designed to output a transfer indication sent from the motor vehicle 4 to the mobile user terminal 6. If the check is completed successfully, a communications link is established between motor vehicle 4 and mobile user terminal 6 in the next step.

In the first of the above-mentioned cases, a transfer indication is generated in a further step in an automated driving condition. The transfer indication can be a regular transfer indication or a transfer request that is necessary owing to a hazardous situation.

Subsequently, the transfer request is processed and output by the mobile user terminal. Then, the driver assumes control of the motor vehicle. Simultaneously thereto, the transfer indication can also be output via the communications device 24 of the motor vehicle 4.

If a plurality of mobile user terminals are coupled to the motor vehicle, the transfer indication can be output simultaneously on the plurality of mobile user terminals.

A communications link is not established between motor vehicle 4 and mobile user terminal if the check in the second step is unsuccessful. In this case, the activation of an automated driving mode can be prevented in a next step, in some embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for producing a communications link between a motor vehicle and a mobile user terminal when the motor vehicle is operating in an autonomous driving mode, comprising:
   sending, by a processor of the motor vehicle, a request to establish a communications link between the motor vehicle and the mobile user terminal;
   checking, by the processor of the motor vehicle, whether the mobile user terminal includes an applications configured to output a transfer indication sent from the motor vehicle to the mobile user terminal, the transfer indication requesting that a user of the mobile user terminal take manual control of the motor vehicle;
   sending, by the processor of the motor vehicle, a request to install the application on the mobile user terminal, when the mobile user terminal does not include the application configured to output the transfer indication;
   enabling, by the processor of the motor vehicle, the communications link between motor vehicle and mobile user terminal when the mobile user terminal includes the application configured to output the transfer indication; and
   sending, by the processor of the motor vehicle, the transfer indication to the mobile user terminal by the communications link when the motor vehicle determines that the motor vehicle should cease the autonomous driving mode,
   wherein the automated driving mode is disabled when the mobile user terminal does not include or have installed the application configured to output the transfer indication in response to the request.

2. The method according to claim 1, further comprising:
   outputting, by the mobile user terminal, the transfer indication on the mobile user terminal in a manner perceptible to the driver.

3. The method according to claim 2, wherein the transfer indication is output in at least one of a visual manner, an audible manner or haptic manner.

4. The method according to claim 1, further comprising establishing a resource priority in the processor of the mobile user terminal for the application.

5. The method according to claim 1, further comprising outputting the transfer indication via a communications system of the motor vehicle.

6. The method according to claim 1, wirelessly sending the transfer indication over a wireless communications link.

7. The method according to claim 1, outputting the transfer indication on a plurality of mobile user terminals simultaneously.

8. The mobile user terminal according to claim 1, wherein the mobile user terminal is selected from the group consisting of a mobile telephone, a tablet, an electronic book-reading device, a smart watch and a music-playing device.

* * * * *

UNITED STATES PATENT AND TRADEMARK OFFICE
CERTIFICATE OF CORRECTION

| | |
|---|---|
| PATENT NO. | : 10,407,082 B2 |
| APPLICATION NO. | : 15/476600 |
| DATED | : September 10, 2019 |
| INVENTOR(S) | : Nikolas Wagner and Gerald Schmidt |

It is certified that error appears in the above-identified patent and that said Letters Patent is hereby corrected as shown below:

In the Claims

Column 7, Line 27, "applications" should be changed to --application--

Signed and Sealed this
Fifth Day of May, 2020

Andrei Iancu
*Director of the United States Patent and Trademark Office*